United States Patent
Dickinson et al.

(10) Patent No.: US 10,995,783 B2
(45) Date of Patent: May 4, 2021

(54) FASTENER CLIP ASSEMBLY WITH A DOME AND LIMITERS

(71) Applicant: Termax LLC, Lake Zurich, IL (US)

(72) Inventors: Daniel James Dickinson, Lincolnshire, IL (US); John Clasen, Crystal Lake, IL (US)

(73) Assignee: TERMAX LLC, Lake Zurich, IL (US)

( * ) Notice: Subject to any disclaimer, the term of this patent is extended or adjusted under 35 U.S.C. 154(b) by 0 days.

(21) Appl. No.: 16/571,185

(22) Filed: Sep. 15, 2019

(65) Prior Publication Data

US 2020/0088226 A1 Mar. 19, 2020

Related U.S. Application Data

(60) Provisional application No. 62/731,881, filed on Sep. 15, 2018.

(51) Int. Cl.
*F16B 5/06* (2006.01)
*F16B 21/07* (2006.01)
*B62D 27/06* (2006.01)
*B60R 13/02* (2006.01)

(52) U.S. Cl.
CPC .......... *F16B 5/0657* (2013.01); *F16B 21/078* (2013.01); *B60R 13/0206* (2013.01); *B60R 13/0243* (2013.01); *B62D 27/06* (2013.01)

(58) Field of Classification Search
CPC .... F16B 5/0657; F16B 21/078; F16B 21/075; F16B 19/1081; F16B 21/16; B62D 27/06; B60R 13/0243; B60R 13/0206
See application file for complete search history.

(56) References Cited

U.S. PATENT DOCUMENTS

| | | | | |
|---|---|---|---|---|
| 4,176,428 A | * | 12/1979 | Kimura | B60R 13/0206 24/297 |
| 4,874,276 A | * | 10/1989 | Iguchi | F16B 19/1081 411/48 |
| 5,375,954 A | * | 12/1994 | Eguchi | F16B 19/1081 411/41 |
| 5,641,255 A | * | 6/1997 | Tanaka | F16B 19/1081 411/45 |
| 6,048,147 A | * | 4/2000 | Arisaka | F16B 19/1081 411/41 |

(Continued)

*Primary Examiner* — Robert Sandy
*Assistant Examiner* — Rowland Do

(57) ABSTRACT

A system and method including a fastener clip assembly including a cap configured to be secured to a chassis through a chassis slot and a pin configured to be secured to a body panel, wherein the pin is configured to be secured to the cap. The pin includes a pin head having a bottom surface and the cap includes one or more fingers. The fingers are configured to bend outward from an original position based at least in part on the pin being inserted into the cap and are configured to bend back to the original position based at least in part on the pin head moving past the fingers. The fingers are configured to secure the pin to cap based at least in part on the fingers engaging a bottom surface of the pin head. The cap includes one or more limiters corresponding to the one or more fingers. The limiters are located to the outside of the fingers, and the limiters are configured to prevent breaking of the fingers based at least in part on the limiters limiting an outward bending of the fingers.

19 Claims, 10 Drawing Sheets

(56) References Cited

U.S. PATENT DOCUMENTS

| | | | |
|---|---|---|---|
| 6,264,393 B1* | 7/2001 | Kraus | B60R 13/0206 24/297 |
| 8,419,330 B2* | 4/2013 | Watanabe | F16B 19/1081 411/45 |
| 10,288,098 B2* | 5/2019 | Meyers | F16B 5/0657 |
| 10,408,248 B1* | 9/2019 | Safry | F16B 19/008 |
| 2003/0143053 A1* | 7/2003 | Kanie | F16B 19/1081 411/45 |
| 2009/0263210 A1* | 10/2009 | Loewe | F16B 21/075 411/553 |
| 2011/0113598 A1* | 5/2011 | Hofmann | F16B 19/1081 24/458 |
| 2012/0213609 A1* | 8/2012 | Moerke | F16B 21/086 411/347 |
| 2014/0050548 A1* | 2/2014 | Loewe | F16B 5/0607 411/48 |
| 2016/0138629 A1* | 5/2016 | Flynn | F16B 19/1081 411/57.1 |
| 2017/0051780 A1* | 2/2017 | Dickinson | F16B 5/0657 |
| 2017/0234343 A1* | 8/2017 | Flynn | F16B 5/0628 411/60.1 |

* cited by examiner

FASTENER CLIP ASSEMBLY WITH A DOME AND LIMITERS

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a post attached to the base and wings attached at least to the top of the post at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the hole in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

Figure 1:
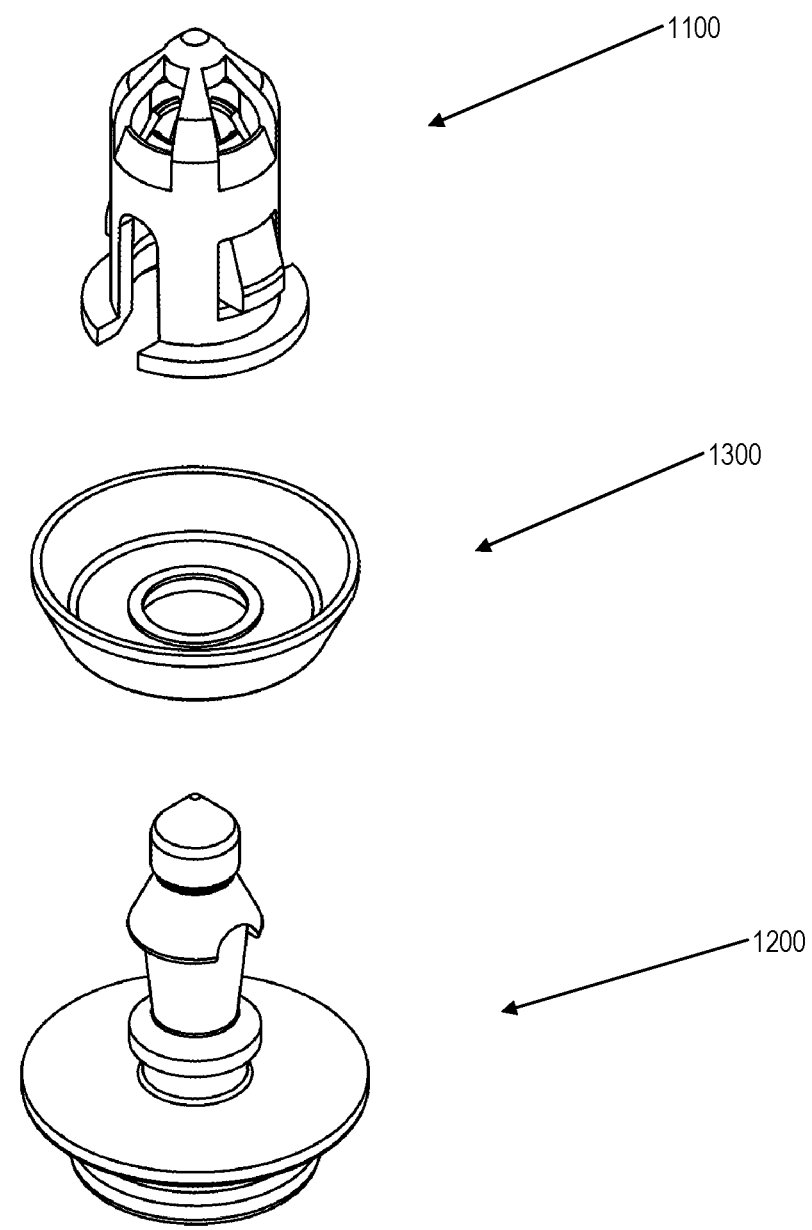
FIG. 1 is an exploded view of a fastener clip assembly, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodi-

C. DETAILED DESCRIPTION

Disclosed below are various concepts related to, and embodiments of, systems and methods for automatically detecting similarities between sensors in order to identify and match sensors of a similar nature and type.

FIG. 1 is an exploded view of a fastener clip assembly, in accordance with some embodiments.

Figure 2:
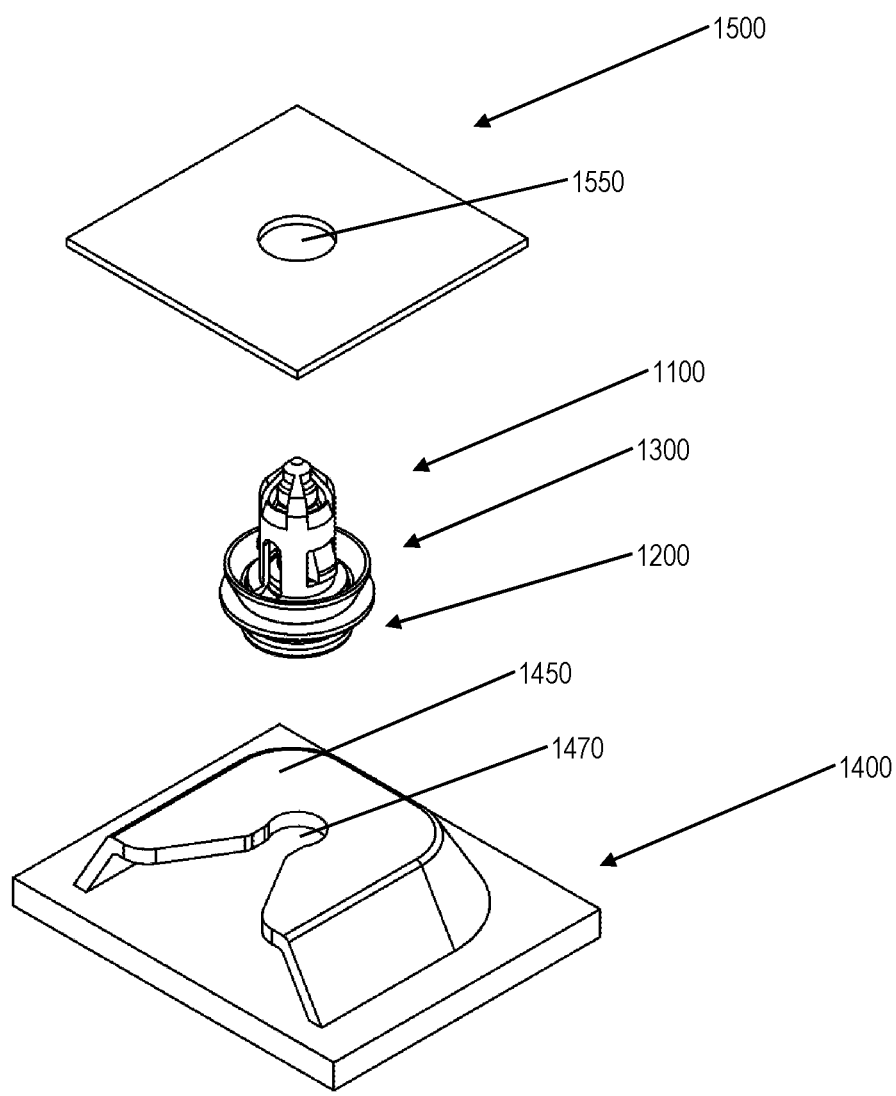
FIG. 2 is an alternative exploded view of a fastener clip assembly, in accordance with some embodiments.

FIG. 2 is an alternative exploded view of a fastener clip assembly, in accordance with some embodiments.

In some embodiments, the fastener clip assembly comprises cap/grommet 1100 and pin/pin retainer 1200. Pin 1200 is configured to engage and secure itself into cap 1100.

In some embodiments, the two-piece assembly may be configured to retain various trim panels (such as panel 1400) to a car chassis (such as chassis 1500). Cap 1100 may be configured to attach to a slot/hole 1550 in chassis 1500, and pin 1200 may be configured to attach to panel 1400 through a doghouse 1450, for example. Pin 1200 may be coupled onto doghouse 1450 by snapping a corresponding depression in the pin sideways onto receiving hole 1470. In some embodiments, doghouse 1450 may be coupled to panel 1400 by various means (such as an adhesive, for example) or doghouse 1450 may molded onto panel 1400.

In some embodiments, chassis 1500 may be attached to panel 1400 based at least upon pin 1200 engaging and attaching to cap 1100.

In some embodiments, seal component 1300 is configured to attach over pin 1200 and to form a seal against the surface of chassis 1500 when the pin is attached to the cap (when the cap is already attached to the chassis). In some embodiments, forming a seal against chassis surface 1500 prevents water, dirt, and other debris from entering through the chassis slot from the outside to the inside of the chassis.

In some embodiments, upon initial insertion of the clip assembly into chassis 1500 and into the doghouse of panel 1400, panel 1400 may be removed from the chassis by applying a certain amount of opposite force to panel 1400. Upon removal of panel 1400 from chassis 1500, cap 1100 is configured to remain in the slot on chassis 1500 as more force is required to remove cap 1100 from chassis 1500 than the force required to remove pin 1200 from cap 1100. Accordingly, in some embodiments, during removal of panel 1400, pin 1200 (as well as seal 1300) may remain attached to the doghouse on panel 1400 and cap 1100 may remain attached to chassis 1500. Panel 1400 may be reattached to chassis 1500 by aligning pin 1200 with cap 1100 and re-engaging/re-attaching pin 1200 to cap 1100. Panel 1400 may be removed and be reattached to chassis 1500 multiple times in a similar manner.

Figure 3:
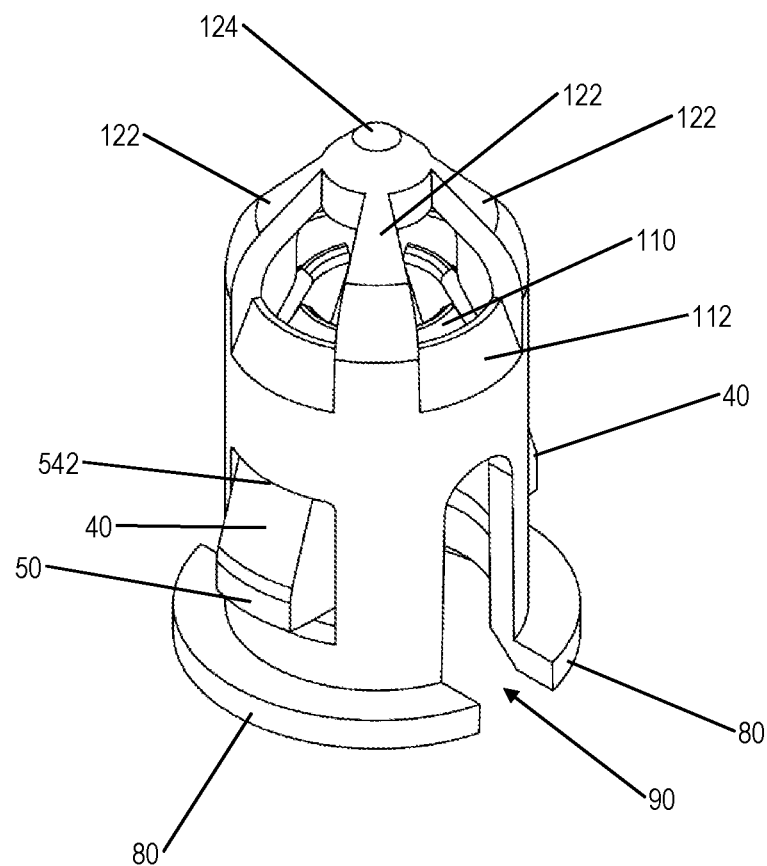
FIG. 3 is a view of a cap of a fastener clip assembly, in accordance with some embodiments.

FIG. 3 is a view of a cap of a fastener clip assembly, in accordance with some embodiments.

Figure 4:
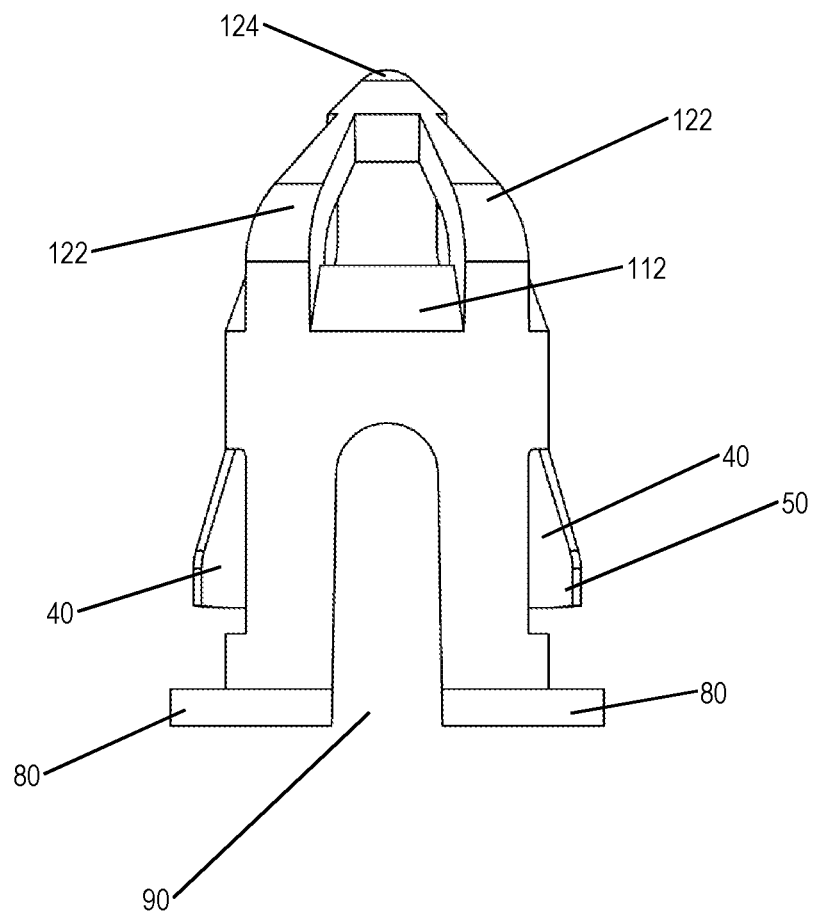
FIG. 4 is an alternative view of a cap of a fastener clip assembly, in accordance with some embodiments.

FIG. 4 is an alternative view of a cap of a fastener clip assembly, in accordance with some embodiments.

In some embodiments, cap 1100 is configured to engage and attach to a slot in a chassis and in addition engage and attach to a pin, which in turn, is configured to engage and attach to a panel.

In some embodiments, cap 1100 comprises one or more wings (two wings 40 are shown here), which are configured to secure the cap to a slot/hole in a chassis, for example. Wings 40 are configured to bend inward during insertion into the slot and return to their original position upon full insertion such that the under surfaces of the wings engage the slot, thereby engaging the slot. Any suitable number of wings 40 may be used. For example, one, two, three, four, etc. wings 40 may be used. According to one embodiment, the wings 40 may have any suitable shape, such as, for example, at least one of: tapered, straight, curved, etc.

The wings 40 have a size, such as a width, length, thickness and a pivot point 542 to provide high extraction force levels while the insertion force level remains relatively low. According to some embodiments, the wings 40 may be fins of varying widths. During extraction, the wings 40 are also in compression; such that the engagement region 50 provides a higher extraction force relative to the insertion force. Additionally, the width of the wing 40 may be increased, increasing the size of the engagement region and the strength of the wing.

In some embodiments, cap 1100 may also comprise funnel portions 80. Funnel portions 80 are configured to guide the head of pin 1200 toward the center of cap 1100 as pin 1200 is pushed into cap 1100 for engagement. As such, less accuracy is needed in the alignment of cap 1100 and pin 1200 when the two approach each other for engagement.

In some embodiments, cap 1100 comprises two (more or less than two in alternative embodiments) service slots 90 placed between funnel portions 80. The service slots 80 are configured to allow inward bending of funnel portions 80 upon pinching of the funnel portions. As such, funnel portions 80 act as releases for the wings 40. As the funnel portions 80 collapse inward, so do wings 80. As such, releasing/pinching the releases/funnel portions 80 disengages the wings from the chassis slot surface and allows for a relatively easier removal of cap 1100 from the chassis slot.

In some embodiments, two service slots 90 may be evenly placed between the two funnel portions 80 to facilitate the inward bending of funnel portions 80 (and wings 40).

In some embodiments, cap 1100 may also include one or more fingers 110. Fingers 110 are configured to bend and then snap back into position as the head of pin 1200 is inserted into cap 1100. Fingers 110 are configured to engage a bottom surface of the head of the pin to lock the pin to the cap once the pin has been inserted into the cap. Fingers 110, in some embodiments, may also be configured to allow extraction of the pin from cap 1100, providing a higher amount of force than the force required to engage the pin in the cap.

In some embodiments, cap 1100 may also include one or more limiters 112 placed behind and, in some embodiments, corresponding to each of fingers 110. Limiters 112 are configured to prevent fingers 110 from overextending while the pin is being inserted into and removed from cap 1100. Overextending may occur, for example, if pin is accidentally inserted into the cap at an angle.

In some embodiments, cap 1100 may also include two or more dome pillars 122 that meet at nose 124 to form a dome at the top of cap 1100. In some embodiments, the dome may assist in inserting cap 1100 into a slot/hole in a chassis by guiding the cap into the slot. By having smooth surfaces formed by dome pillars 122 and nose 124, cap 1100 substantially eliminates the possibility of impeding the motion of the cap during insertion of the cap into the slot.

In some embodiments, the dome formed by dome pillars 122 may also assist in situating pin 1200 into cap 1100 during insertion of pin 1200 into cap 1100. In addition, the dome formed by dome pillars 122 may also assist in less movement of pin 1200 while removing pin 1200 from within cap 1100.

Figure 5:
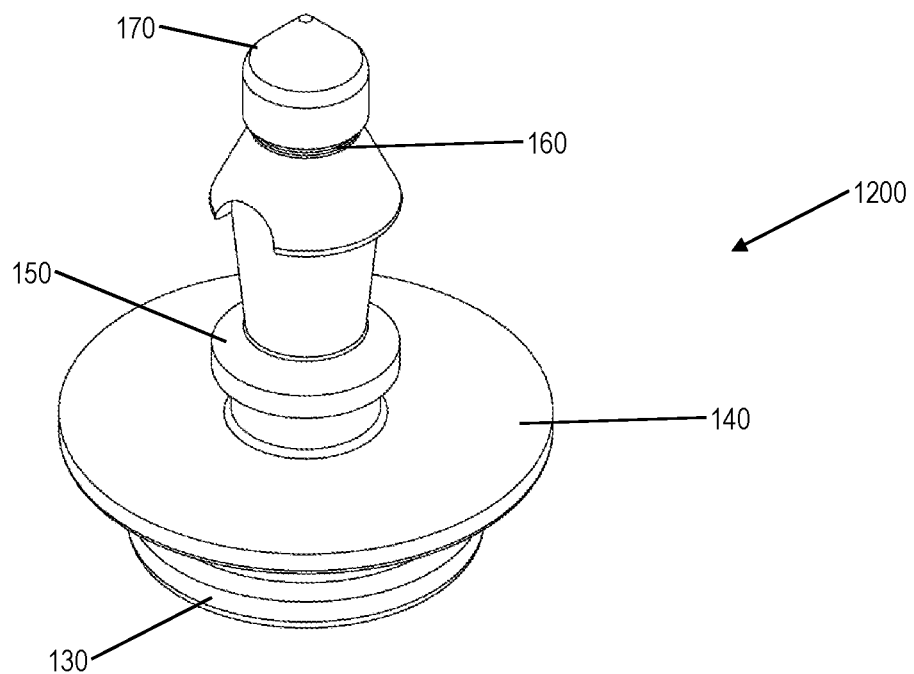
FIG. 5 is a view of a pin of a fastener clip assembly, in accordance with some embodiments.

FIG. 5 is a view of a pin of a fastener clip assembly, in accordance with some embodiments.

Figure 6:
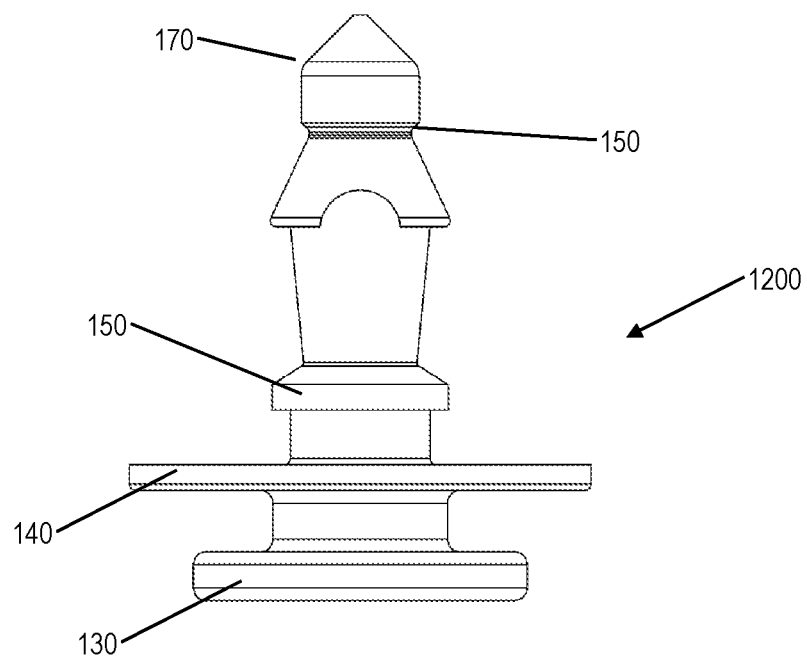
FIG. 6 is an alternative view of a pin of a fastener clip assembly, in accordance with some embodiments.

FIG. 6 is an alternative view of a pin of a fastener clip assembly, in accordance with some embodiments.

Pin 1200 is configured to engage and lock itself into cap 1100. Pin 1200, in some embodiments, comprises pin head 170, which is tapered and is configured to guide the pin into the cap. A bottom surface 160 of the pin head 170 is configured to engage the top of fingers 110 of the cap and to lock against them in order to prevent unwanted removal of the pin from the cap. Base disk 130 of the pin is configured to engage and lock into a housing (doghouse) in a trim panel, for example.

In some embodiments, seal retainers 150 and 140 are configured to support between them a seal opening of a seal that may be inserted over the pin, as will be described in relevant sections. Seal retainer 150 may also be configured to push against funnel portions 80 when attaching the pin to the cap. In such embodiments, when the pin and the cap are engaged and locked into each other, seal retainer 150 is configured to prevent funnel portions from collapsing and releasing the cap from the chassis slot.

Figure 7:
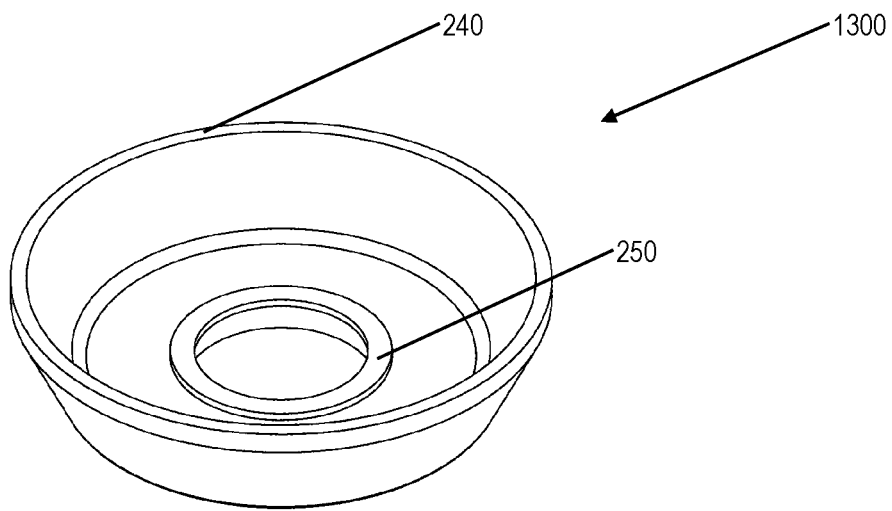
FIG. 7 is a view of a seal of a fastener clip assembly, in accordance with some embodiments.

FIG. 7 is a view of a seal of a fastener clip assembly, in accordance with some embodiments.

Removable seal 1300 is configured to slide over pin 1200 through central hub/rim 250 and to form a seal against the chassis surface based at least upon the pin engaging and locking into cap 1100. Umbrella 240, which is the portion of the seal configured to seal against the surface of the chassis, is attached to the pin 1200 through central hub/rim 250. In some embodiments, removable seal 1300 may rest between lower seal retainer 140 and higher seal retainer 150, which are configured to keep the seal in place.

It should be noted that having a removable seal provides several advantages. For example, the parts may be manufactured more easily and may be made from different materials—such as a harder and more rigid material for the pin and a softer and more sealing material for the seal.

Figure 8:
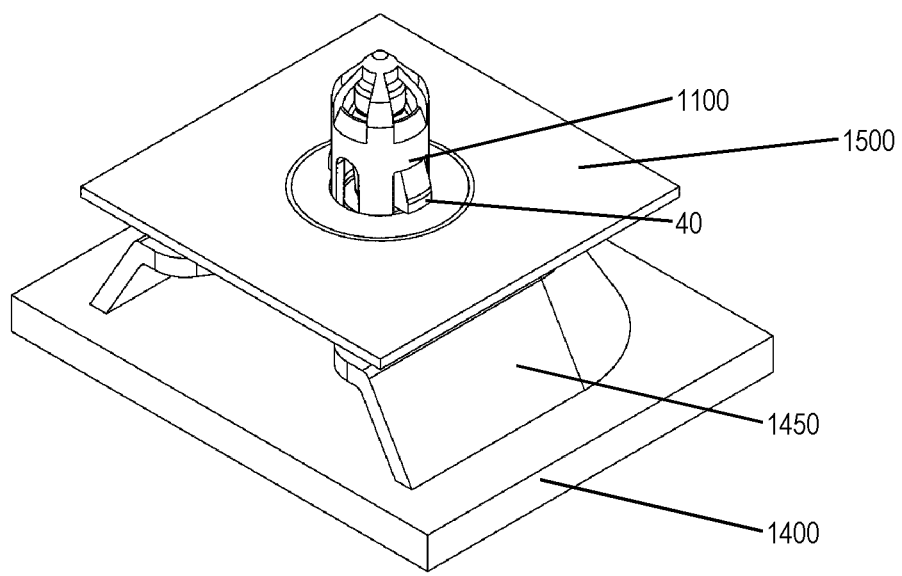
FIG. 8 is an assembled view of a fastener clip assembly, in accordance with some embodiments.

FIG. 8 is an assembled view of a fastener clip assembly, in accordance with some embodiments.

Figure 9:
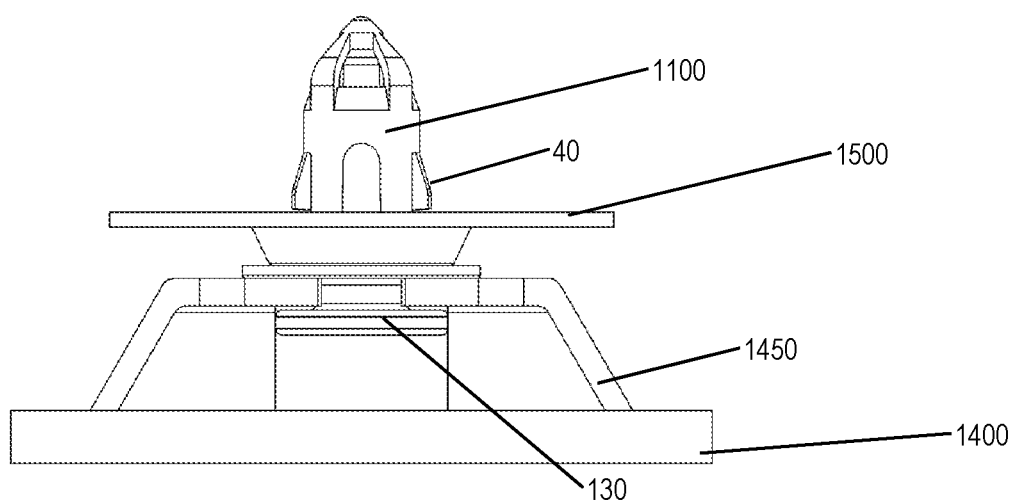
FIG. 9 is an alternative assembled view of a fastener clip assembly, in accordance with some embodiments.

FIG. 9 is an alternative assembled view of a fastener clip assembly, in accordance with some embodiments.

Figure 10:
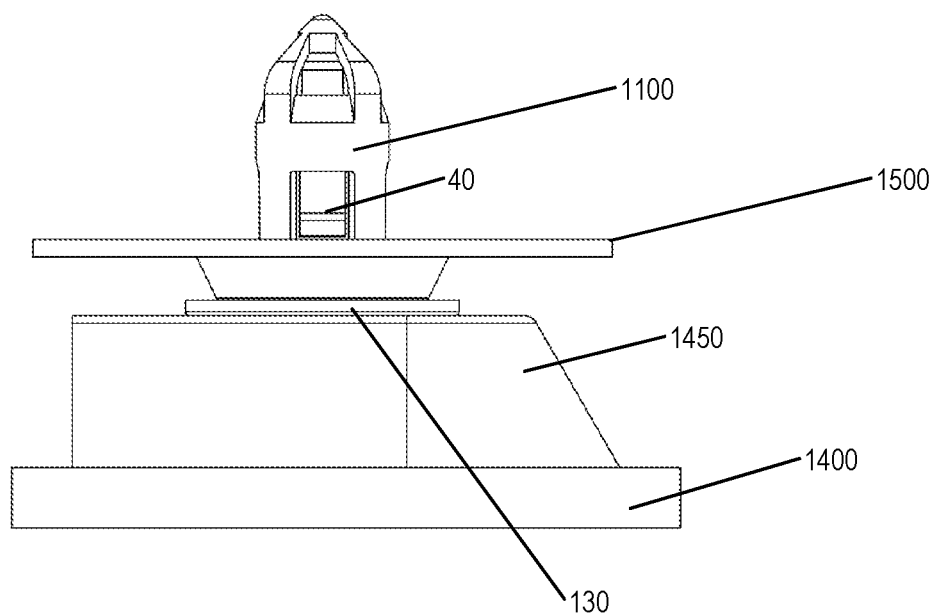
FIG. 10 is yet another assembled view of a fastener clip assembly, in accordance with some embodiments.

FIG. 10 is yet another assembled view of a fastener clip assembly, in accordance with some embodiments.

Cap 1100 is installed in a slot in chassis 1500, with the wings 40 in the extended position over the surface of chassis 1500, thereby supporting cap 1100 against the chassis. Base disk of the pin attaches the pin to housing/doghouse 1450 of the trim panel 1400. The pin has been pushed through the cap 1100 and the pin head is secured to the cap by the fingers of the cap, thereby securing trim panel 1400 to chassis 1500.

In some embodiments, the fastener clip may be manufactured with injection molding using materials such as plastic nylon, polyoxymethylene (POM, also known as acetal), ABS, Polypropylene, rubber materials of various hardness, etc. It should be noted again that different materials may be used for the different parts of the fastener clip.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip assembly comprising:
   a cap configured to be secured to a chassis through a chassis slot;
   a pin configured to be secured to a body panel,
   wherein the pin is configured to be secured to the cap;
   wherein the pin comprises a pin head having a bottom surface,
   wherein the cap comprises:
   two or more dome pillars that meet to form a dome at a top of the cap, one or more fingers, wherein the one or more fingers are configured to bend outward from an original position based at least in part on the pin being inserted into the cap, wherein the one or more fingers are configured to bend back to the original position based at least in part on the pin head moving past the one or more fingers, wherein the one or more fingers are configured to secure the pin to the cap based at least in part on the one or more fingers engaging the bottom surface of the pin head,
   one or more limiters, wherein the one or more limiters are placed between the two or more pillars, wherein the one or more limiters are located to the outside of the one or more fingers, wherein the one or more limiters are configured to limit an outward bending of the one or more fingers.

2. The fastener clip assembly of claim 1, wherein the cap further comprises two or more dome pillars, the one or more dome pillars meeting at a dome nose forming a dome at the top of the cap, wherein the dome is configured to facilitate easier insertion of the cap into the chassis slot.

3. The fastener clip assembly of claim 1, wherein each of the one or more limiters corresponds to each of the one or more fingers.

4. The fastener clip assembly of claim 1, wherein the one or more limiters are configured to prevent breaking of the one or more fingers based at least in part on the one or more limiters limiting an outward bending of the one or more fingers.

5. The fastener clip assembly of claim 1, wherein a removable seal configured to be attached between the pin and the cap, wherein the removable seal is configured to form a seal against the chassis based at least upon the pin being secured to the cap and the cap being secured to the slot in the chassis.

6. The fastener clip assembly of claim 5, wherein the removable seal comprises:
    a central hub configured to be inserted on the pin;
    an umbrella coupled to the central hub, wherein the umbrella is configured to substantially seal against the chassis.

7. The fastener clip assembly of claim 1, wherein the cap further comprises one or more funnel portions, wherein the one or more funnel portions are sloped toward the center of the cap, wherein the one or more funnel portions are configured to guide the pin into the cap.

8. The fastener clip assembly of claim 1, wherein the pin further comprises: a base disc configured to releasably attach to a corresponding housing on a body panel.

9. The fastener clip assembly of claim 1, wherein the pin further includes a pin post having a lower seal retainer and a higher seal retainer configured to support a central hub of a seal between the lower seal retainer and the higher seal retainer.

10. The fastener clip assembly of claim 1, wherein the cap further comprises one or more wings extending outwards from a top of the cap, wherein the one or more wings are configured to secure the cap to the slot based at least upon the one or more wings bending out during insertion of the cap into the slot and bending back over the slot upon completion of the insertion of the cap into the slot.

11. A fastener clip assembly comprising:
    a cap configured to be secured to a chassis through a chassis slot;
    a pin configured to be secured to a body panel, wherein the pin is configured to be secured to the cap;
    wherein the cap comprises two or more dome pillars, the two or more dome pillars meeting at a dome nose forming a dome at the top of the cap, wherein the dome is configured to facilitate easier insertion of the cap into the chassis slot,
    wherein the pin comprises a pin head having a bottom surface,
    wherein the cap comprises:
        one or more fingers wherein the one or more fingers are placed between the two or more pillars, wherein the one or more fingers are configured to bend outward from an original position based at least in part on the pin being inserted into the cap, wherein the one or more fingers are configured to bend back to the original position based at least in part on the pin head moving past the one or more fingers, wherein the one or more fingers are configured to secure the pin to cap based at least in part on the one or more fingers engaging the bottom surface of the pin head.

12. The fastener clip assembly of claim 11, wherein the cap further comprises one or more limiters, wherein the one or more limiters are located to the outside of the one or more fingers, wherein the one or more limiters are configured to limit an outward bending of the one or more fingers.

13. The fastener clip assembly of claim 12, wherein each of the one or more limiters corresponds to each of the one or more fingers.

14. The fastener clip assembly of claim 11, wherein a removable seal configured to be attached between the pin and the cap, wherein the removable seal is configured to form a seal against the chassis based at least upon the pin being secured to the cap and the cap being secured to the slot in the chassis.

15. The fastener clip assembly of claim 14, wherein the removable seal comprises:
    a central hub configured to be inserted on the pin;
    an umbrella coupled to the central hub, wherein the umbrella is configured to substantially seal against the chassis.

16. The fastener clip assembly of claim 11, wherein the cap further comprises one or more funnel portions, wherein the one or more funnel portions are sloped toward the center of the cap, wherein the one or more funnel portions are configured to guide the pin into the cap.

17. The fastener clip assembly of claim 11, wherein the pin further comprises: a base disc configured to releasably attach to a corresponding housing on a body panel.

18. The fastener clip assembly of claim 11, wherein the pin further includes a pin post having a lower seal retainer and a higher seal retainer configured to support a central hub of a seal between the lower seal retainer and the higher seal retainer.

19. The fastener clip assembly of claim 11, wherein the cap further comprises one or more wings extending outwards from a top of the cap, wherein the one or more wings are configured to secure the cap to the slot based at least upon the one or more wings bending out during insertion of the cap into the slot and bending back over the slot upon completion of the insertion of the cap into the slot.

* * * * *